(12) United States Patent
Basavin et al.

(10) Patent No.: US 12,381,723 B2
(45) Date of Patent: Aug. 5, 2025

(54) DISTRIBUTED SECRET MANAGEMENT

(71) Applicant: Snowflake Inc., Bozeman, MT (US)

(72) Inventors: Dmitry Basavin, Seattle, WA (US);
Aaron S. Joyner, Granite Falls, NC (US); Kyle Leonhard, Seattle, WA (US)

(73) Assignee: Snowflake Inc., Bozeman, MT (US)

(*) Notice: Subject to any disclaimer, the term of this patent is extended or adjusted under 35 U.S.C. 154(b) by 0 days.

(21) Appl. No.: 18/520,869

(22) Filed: Nov. 28, 2023

(65) Prior Publication Data
US 2024/0388426 A1    Nov. 21, 2024

Related U.S. Application Data

(63) Continuation of application No. 18/320,152, filed on May 18, 2023, now Pat. No. 11,870,895.

(51) Int. Cl.
*H04L 9/08* (2006.01)
(52) U.S. Cl.
CPC .......... *H04L 9/0861* (2013.01); *H04L 9/0819* (2013.01); *H04L 9/0894* (2013.01)
(58) Field of Classification Search
None
See application file for complete search history.

(56) References Cited

U.S. PATENT DOCUMENTS

2010/0251339 A1* 9/2010 McAlister ............. G06F 21/604
726/4
2019/0305938 A1 10/2019 Sandberg-Maitland et al.

OTHER PUBLICATIONS

"U.S. Appl. No. 18/320,152, Non Final Office Action mailed Aug. 7, 2023", 7 pgs.
"U.S. Appl. No. 18/320,152, Notice of Allowance mailed Sep. 13, 2023", 6 pgs.
"U.S. Appl. No. 18/320,152, Response filed Aug. 31, 2023 to Non Final Office Action mailed Aug. 7, 2023", 10 pgs.

* cited by examiner

*Primary Examiner* — Brandon Hoffman
(74) *Attorney, Agent, or Firm* — Schwegman Lundberg & Woessner, P.A.

(57) ABSTRACT

A data platform provides for encryption of secrets. During operation, an application of the data platform receives a secret and communicates the secret to an encryption client of the data platform. The encryption client generates an encrypted secret using a Data Encryption Key (DEK) and the secret. The encryption client communicates the DEK to an encryption server of the data platform while retaining the encrypted secret. The encryption server generates an encrypted DEK using a Transit Encryption Key TEK. The encryption server communicates the encrypted DEK to the encryption client and the encryption client generates a binary large object (blob) using the retained encrypted secret and the encrypted DEK. The application stores the blob on a data storage device.

27 Claims, 11 Drawing Sheets

DISTRIBUTED SECRET MANAGEMENT

PRIORITY CLAIM

This application is a Continuation of U.S. patent application Ser. No. 18/320,152, filed May 18, 2023, now U.S. Pat. No. 11,870,895, the contents of which are hereby incorporated by reference.

TECHNICAL FIELD

Examples of the disclosure relate generally to databases and, more specifically, to distributed secret storage and authorization.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

Management of a database is facilitated by automated security processes.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
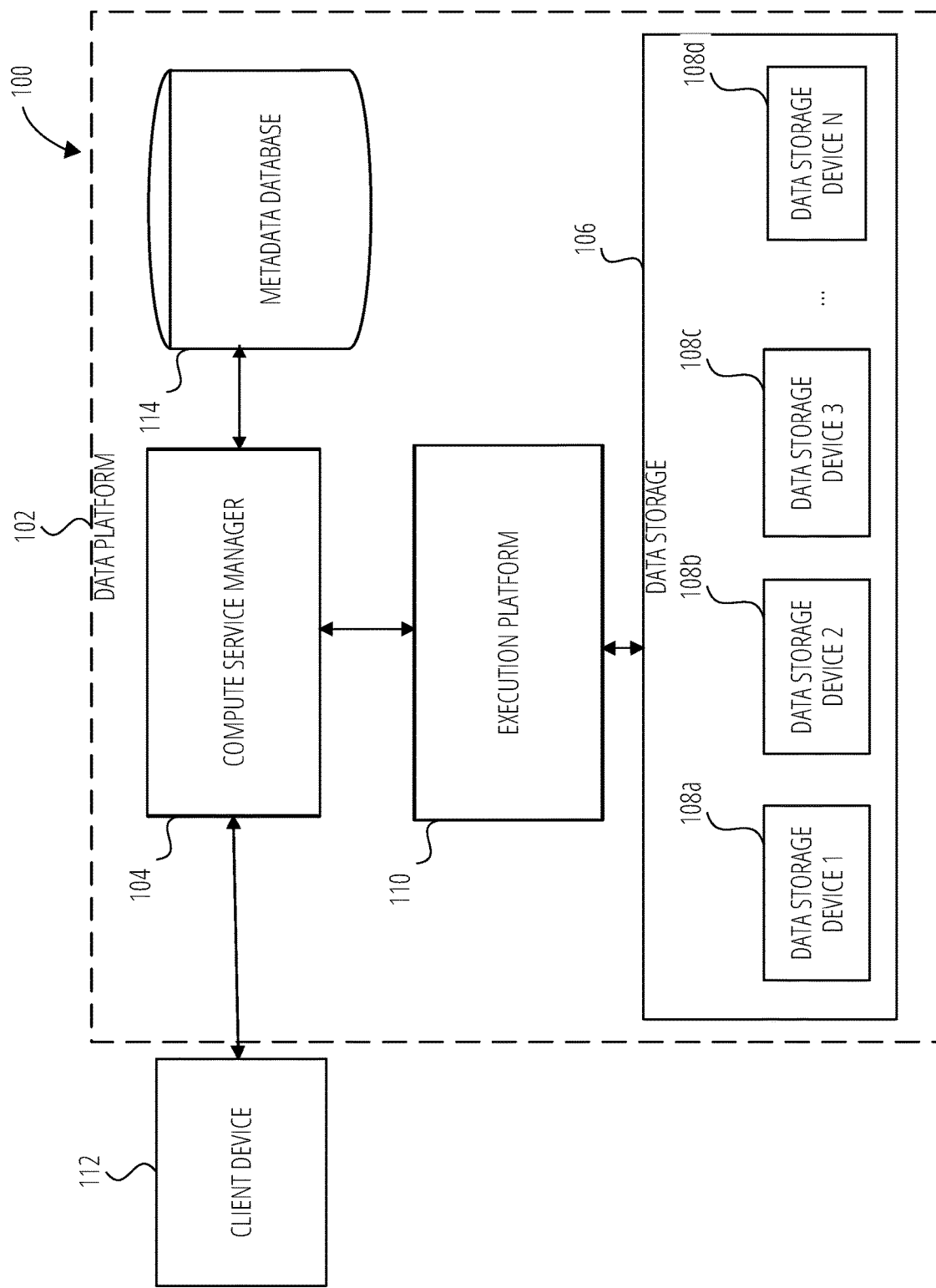
FIG. 1 illustrates an example computing environment that includes a network-based data platform in communication with a cloud storage provider system, in accordance with some examples.

Some data security systems use encrypted keys to protect sensitive data by encrypting the data using cryptographic algorithms and securing the encryption keys. A key management system generates encryption keys and the encryption keys themselves are also encrypted to ensure their security. A separate encryption key, known as the master key, is used to encrypt the encryption keys. The encrypted keys are securely stored in a key management system. When data needs to be accessed or decrypted, the authorized users or systems are provided with the necessary encrypted keys. To decrypt the encrypted data, the authorized recipient uses their authorized access to obtain the necessary encrypted key. The encrypted key is then decrypted using the master key. Once the encryption key is decrypted, it can be used to decrypt the data. To enhance security, key rotation and revocation mechanisms can be implemented. Key rotation involves generating new encryption keys periodically and securely replacing the old keys.

However, there are several problems with using a centralized key encryption system in a distributed system. If the keys are stored on a central TEK server, outage of the TEK server prevents other systems from accessing the keys and causes a cascade of failures throughout the distributed system. In addition, scaling the TEK server may raise the probability that TEK server will be exposed to corruption and outage. Rotation of the keys is also problematic as rotating a key may cause previously encrypted data to be inaccessible. Some applications may utilize key storage formats where a password is stored in source code in clear text and a persistent insider could gain access to a key. In some applications, after a key is stored in a user datastore, access to the key is not monitored, audited, or logged. In addition, in some distributed systems, various entities may have control over different components of the distributed system and it is not desirable for all entities to have copies of the data that is being secured, whether that data is in an unencrypted format or in an encrypted format.

In some examples of the methodologies and systems of this disclosure, a stateless Crypto-as-a-Service (CaaS) service for encrypting secrets is provided.

In some examples, a client library for an encryption client and a sharded stateless encryption service is provided. The encryption client interface provides an encrypt and decrypt operation using an envelope encryption scheme. Data is encrypted using a unique Data Encryption Key (DEK) which is in turn encrypted by the encryption service using a Transit Encryption Key (TEK) persisted in each shard's respective cloud service provider object storage.

In some examples, security of the system is improved as TEKs are isolated within the encryption service codebase in a compact storage location with few contributors.

In some examples, every object is encrypted with a unique DEK, which reduces the impact of a leaked key, limits the information available for cryptanalysis, and enables seamless adoption of new encryption algorithms in response to future algorithmic vulnerabilities.

In some examples, TEK rotation is supported natively.

In some examples, TEK observability is improved through logging every access to the TEKs and making the details available to compliance.

In some examples, scalability and reliability of the encryption process is improved as an encryption service is stateless and only manages a few TEKs at any given time.

In some examples, TEKs cannot be misused, such as by directly encrypting data.

In some examples, an application of a data platform receives a secret and communicates the secret to an encryption client. The encryption client generates an encrypted secret using the DEK and the secret and communicates the DEK to an encryption server while retaining the encrypted secret. The encryption server fetches a TEK from a TEK server and generates an encrypted DEK using the TEK. The encryption server communicates the encrypted DEK to the encryption client. The encryption client generates a binary large object (blob) using the retained encrypted secret and the encrypted DEK and communicates the blob to the application and the application stores the blob.

In some examples, the application stores the blob on a data storage device that is external to the data platform.

In some examples, the application stores the blob on a data storage device of the data platform under a user account.

In some examples, the encryption server communicates metadata of the encrypted DEK to the encryption client.

In some examples, the encryption client further uses the metadata of the encrypted DEK to generate the blob.

In some examples, the metadata of the encrypted DEK includes an identifier of the TEK.

In some examples, the application retrieves the blob from the data storage device and communicates the blob to the encryption client, The encryption client extracts from the blob, the encrypted DEK and the metadata of the encrypted DEK and communicates the encrypted DEK and metadata of the encrypted DEK to the encryption server. The encryption server fetches from the TEK server, the TEK using the metadata of the encrypted DEK and generates the DEK using the encrypted DEK and the TEK. The encryption server communicates to the encryption client, the DEK. The encryption client generates the secret using the DEK and the encrypted secret and communicates the secret to the application. The application uses the secret to access an object of a data platform.

In some examples, the encryption server accesses the TEK using a pointer.

In some examples, the data platform hosts a plurality of instances of the encryption server.

In some examples, the plurality of instances of the encryption server operate independently of each other.

Reference will now be made in detail to specific examples for carrying out the inventive subject matter. Examples of these specific examples are illustrated in the accompanying drawings, and specific details are set forth in the following description in order to provide a thorough understanding of the subject matter. It will be understood that these examples are not intended to limit the scope of the claims to the illustrated examples. On the contrary, they are intended to cover such alternatives, modifications, and equivalents as may be included within the scope of the disclosure.

FIG. 1 illustrates an example computing environment 100 that includes a data platform 102 in communication with a client device 112, in accordance with some examples. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a data storage 106, a compute service manager 104, an execution platform 110, and a metadata database 114. The data storage 106 comprises a plurality of computing machines and provides on-demand computer system resources such as data storage and computing power to the data platform 102. As shown, the data storage 106 comprises multiple data storage devices, such as data storage device 1 108a, data storage device 2 108b, data storage device 3 108c, and data storage device N 108d. In some examples, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3™ storage systems or any other data storage technology. Additionally, the data storage 106 may include distributed file systems (e.g., Hadoop Distributed File Systems (HDFS)), object storage systems, and the like.

The data platform 102 is used for reporting and analysis of integrated data from one or more disparate sources including the storage devices 1 to N within the data storage 106. The data platform 102 hosts and provides data reporting and analysis services to multiple consumer accounts. Administrative users can create and manage identities (e.g., users, roles, and groups) and use privileges to allow or deny access to identities to resources and services. Generally, the data platform 102 maintains numerous consumer accounts for numerous respective consumers. The data platform 102 maintains each consumer account in one or more storage devices of the data storage 106. Moreover, the data platform 102 may maintain metadata associated with the consumer accounts in the metadata database 114. Each consumer account includes multiple objects with examples including users, roles, privileges, a datastores or other data locations (herein termed a "stage" or "stages"), and the like.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client device 112. The client device 112 can be used by a user of one of the multiple consumer accounts supported by the data platform 102 to interact with and utilize the functionality of the data platform 102. In some examples, the compute service manager 104 does not receive any direct communications from the client device 112 and only receives communications concerning jobs from a queue within the data platform 102.

The compute service manager 104 is also coupled to metadata database 114. The metadata database 114 stores data pertaining to various functions and examples associated with the data platform 102 and its users. In some examples, the metadata database 114 includes a summary of data stored in remote data storage systems as well as data available from a local cache. In some examples, the metadata database 114 may include information regarding how data is organized in remote data storage systems (e.g., the database storage 106) and the local caches. In some examples, the metadata database 114 include data of metrics describing usage and access by providers and consumers of the data stored on the data platform 102. In some examples, the metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. The execution platform 110 is coupled to the database storage 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle all communication with a compute cluster for a given job provided by the compute service manager 104 and to communicate information back to the compute service manager 104 and other compute nodes of the execution platform 110.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

As shown in FIG. 1, the data storage devices data storage device 1 108a to data storage device N 108d are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata database 114, execution platform 110, and data storage 106 are shown in FIG. 1 as individual discrete components. However, each of the compute service manager 104, metadata database 114, execution platform 110, and data storage 106 may be implemented as a distributed system (e.g., distributed across multiple systems/platforms at multiple geographic locations). Additionally, each of the compute service manager 104, metadata database 114, execution platform 110, and data storage 106 can be scaled up or down (independently of one another) depending on changes to the requests received and the changing needs of the data platform 102. Thus, in the described examples, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the data storage 106. It is desirable to retrieve as much data as possible from caches within the execution platform 110 because the retrieval speed is typically faster than retrieving data from the data storage 106.

As shown in FIG. 1, the computing environment 100 separates the execution platform 110 from the data storage 106. In this arrangement, the processing resources and cache resources in the execution platform 110 operate independently of the database storage devices data storage device 1 108a to data storage device N 108d in the data storage 106. Thus, the computing resources and cache resources are not restricted to a specific one of the data storage device 1 108a to data storage device N 108d. Instead, all computing resources and all cache resources may retrieve data from, and store data to, any of the data storage resources in the data storage 106.

Figure 2:
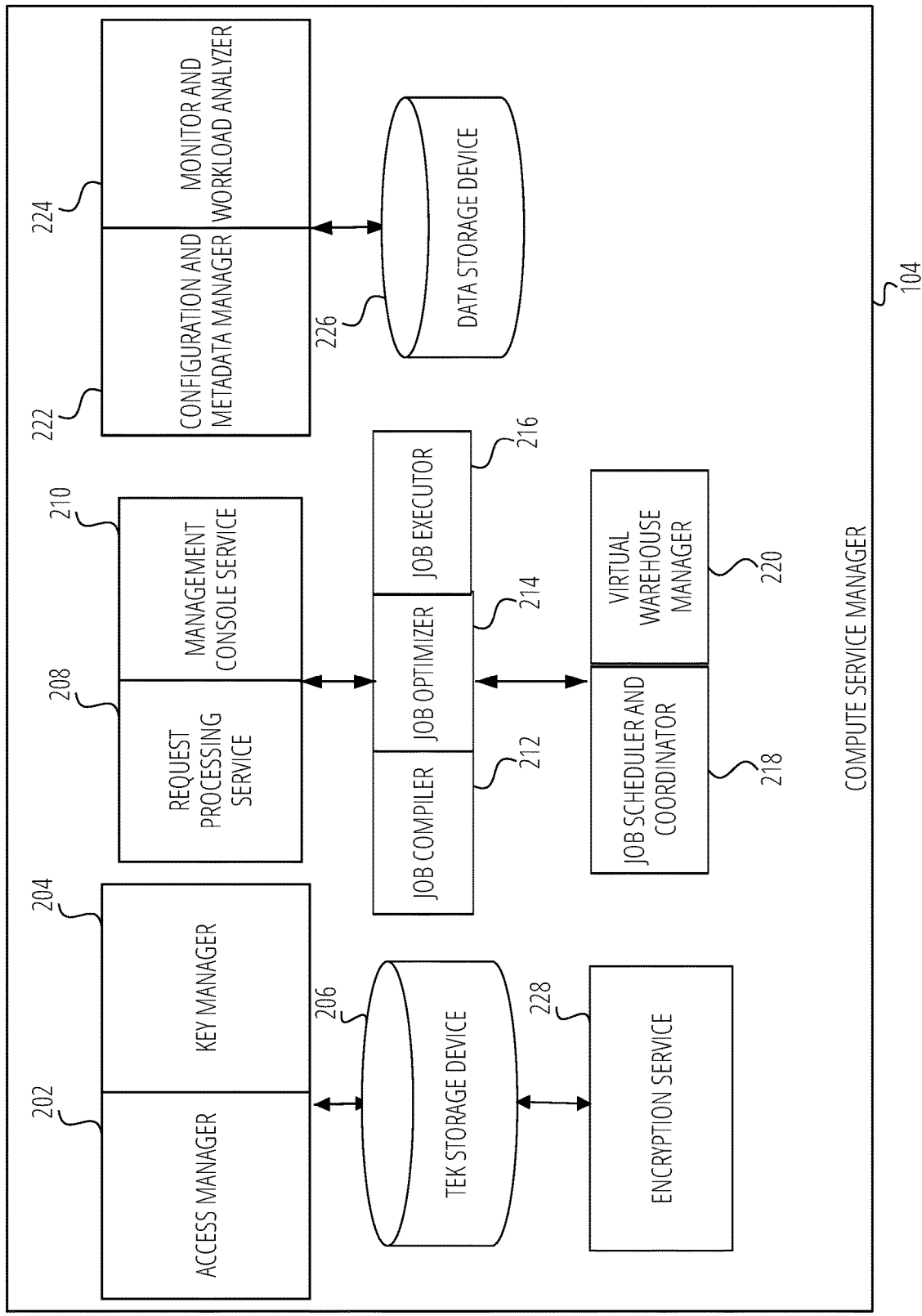
FIG. 2 is a block diagram illustrating components of a compute service manager, in accordance with some examples.

FIG. 2 is a block diagram illustrating components of the compute service manager 104, in accordance with some examples. As shown in FIG. 2, the compute service manager 104 includes an access manager 202 and a key manager 204 coupled to a TEK storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in data storage 106). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in data storage 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216.

The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order. In some examples, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in data storage 106, or any other storage device.

In some examples, the compute service manager 104 further includes an encryption service 228 that provides encryption services for the data platform 102. Components of the encryption service 228 access a TEK storage device 206 to retrieve TEKs stored by the key manager 204. The TEKs are used to encrypt DEKs and decrypt encrypted DEK as more fully described in reference to FIG. 4B, and FIG. 5B.

The compute service manager 104 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 1 304a) may need to communicate with another execution node (e.g., execution node 2 304b), and should be disallowed from communicating with a third execution node (e.g., execution node 1 316a) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
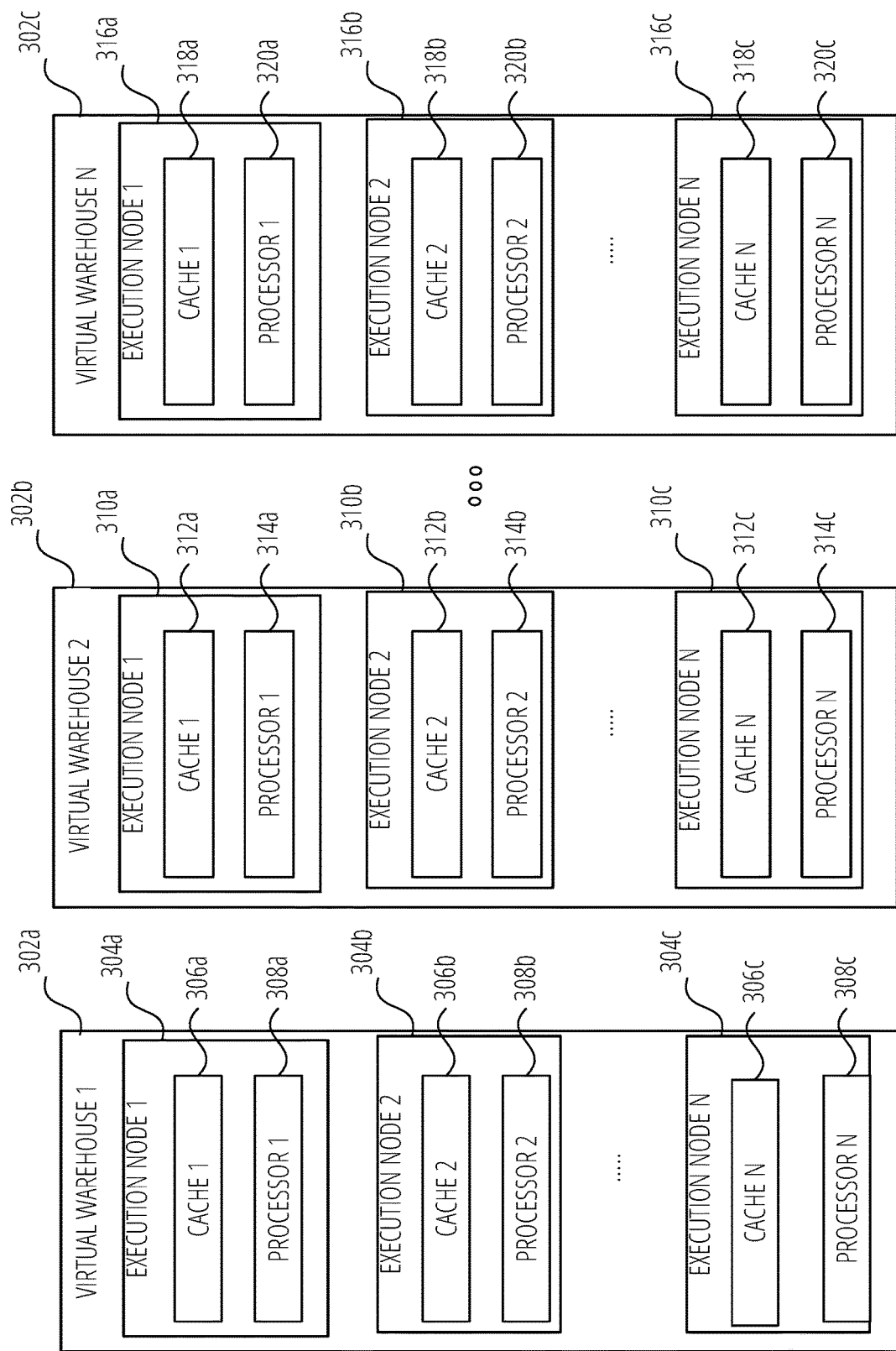
FIG. 3 is a block diagram illustrating components of an execution platform, in accordance with some examples.

FIG. 3 is a block diagram illustrating components of the execution platform 110, in accordance with some examples. As shown in FIG. 3, the execution platform 110 includes multiple virtual warehouses, including virtual warehouse 1 302a, and virtual warehouse 2 302b to virtual warehouse N 302c. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in data storage 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device 1 to N and, instead, can access data from any of the data storage devices 1 to N within the data storage 106. Similarly, each of the execution nodes shown in FIG. 3 can access data from any of the data storage devices 1 to N. In some examples, a particular virtual warehouse or a particular execution node may be temporarily assigned to a specific data storage device, but the virtual warehouse or execution node may later access data from any other data storage device.

In the example of FIG. 3, virtual warehouse 1 302a includes a plurality of execution nodes as exemplified by execution node 1 304a, execution node 2 304b, and execution node N 304c. Execution node 1 304a includes cache 1 306a and a processor 1 308a. Execution node 2 304b includes cache 2 306b and processor 2 308b. Execution node N 304c includes cache N 306c and processor N 308c. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 302a discussed above, virtual warehouse 2 302b includes a plurality of execution nodes as exemplified by execution node 1 310a, execution node 2 310b, and execution node N 310c. Execution node 1 304a includes cache 1 312a and processor 1 314a. Execution node 2 310*b* includes cache 2 312*b* and processor 2 314*b*. Execution node N 310*c* includes cache N 312*c* and processor N 314*c*. Additionally, virtual warehouse N 302*c* includes a plurality of execution nodes as exemplified by execution node 1 316*a*, execution node 2 316*b*, and execution node N 316*c*. Execution node 1 316*a* includes cache 1 318*a* and processor 1 320*a*. Execution node 2 316*b* includes cache 2 318*b* and processor 2 320*b*. Execution node N 316*c* includes cache N 318*c* and processor N 320*c*.

In some examples, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate examples may include execution nodes containing any number of processors and any number of caches. Additionally, the caches may vary in size among the different execution nodes. The caches shown in FIG. 3 store, in the local execution node, data that was retrieved from one or more data storage devices in data storage 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the data storage 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 1 302*a* implements execution node 1 304*a* and execution node 2 304*b* on one computing platform at a geographic location and implements execution node N 304*c* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in data storage 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4A:
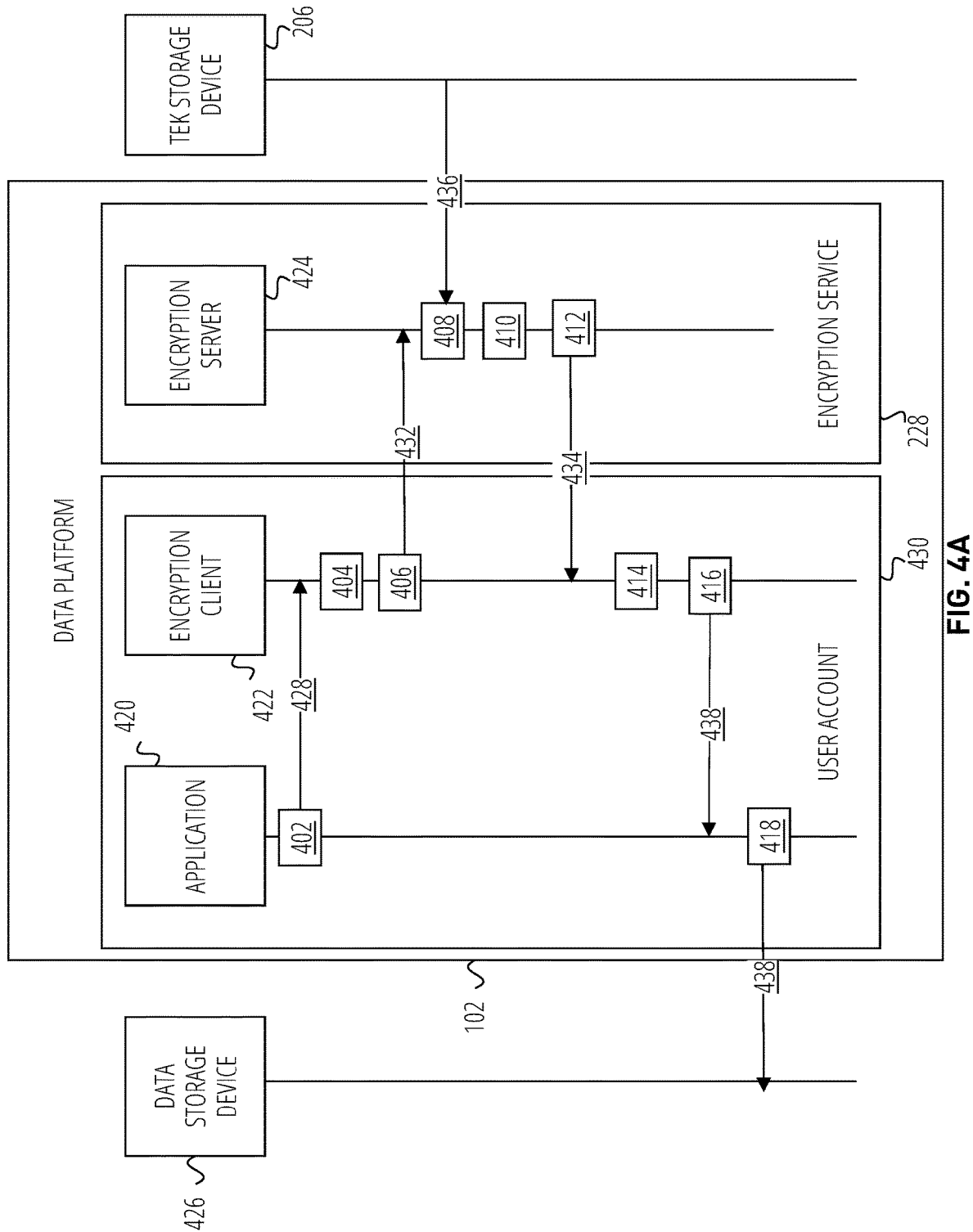
FIG. 4A is a sequence diagram of an encrypted secret generation process, in accordance with some examples.
Figure 4B:
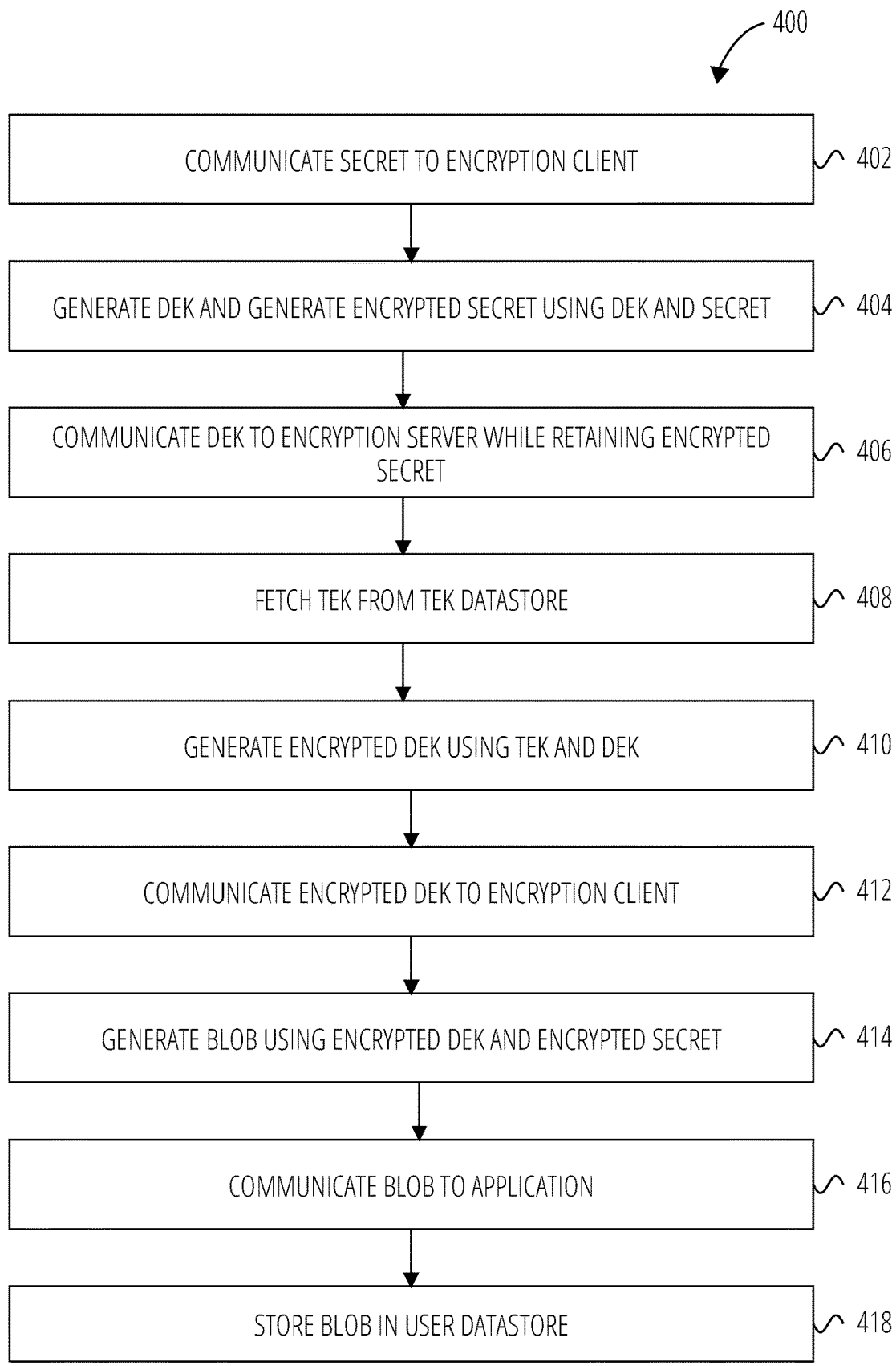
FIG. 4B is an activity diagram of an encrypted secret generation method, in accordance with some ecamples.

FIG. 4A is a sequence diagram of an encrypted secret generation process, and FIG. 4B is an activity diagram of an encrypted secret generation method 400, in accordance with some examples. Although the encrypted secret generation method 400 depicts a particular sequence of operations, the sequence of operations may be altered without departing from the scope of the present disclosure. For example, some of the operations depicted may be performed in parallel or in a different sequence that does not materially affect the function of the method. In other examples, different components of a data platform 102 may implement the encrypted secret generation method 400 and may perform operations at substantially the same time or in a specific sequence.

In operation 402, an application 420 executing on a data platform 102 communicates a secret 428 to an encryption client 422 of the data platform 102. For example, the application 420 executes on the data platform 102 in the context of a user account 430. The user account 430 is associated with a user of the data platform 102. Users may include, but are not limited to, providers of data services to one or more consumers on the data platform 102, consumers of the data services, a proprietor of the data platform, and the like. The secret 428 may be any type of object that the user wants to encrypt such as, but not limited to, passwords and/or credentials used by the application 420 to access other data objects on the data platform 102 or access systems external to the data platform 102, contents of an object of the data platform 102, and the like. The application 420 may receive the secret 428 from any source such as, but not limited to, from the user inputting the secret 428 into the application 420, the application 420 generating the secret 428, the application 420 receiving the secret 428 from another application, and the like. The encryption client 422 executing on the data platform 102 within the aegis of the user account 430, receives the secret 428 from the application 420.

In operation 404, the encryption client 422 generates a DEK 432 and generates an encrypted secret using the DEK 432 and the secret 428. For example, the encryption client 422 generates the DEK 432 using a secure Random Number Generator (RNG) or a Cryptographically Secure Pseudo-Random Number Generator (CSPRNG) and a cryptographic algorithm, a Key Derivation Function (KDF), or the like. The encryption client 422 encrypts the secret using the DEK. For example, the encryption client 422 selects an encryption algorithm such as, but not limited to, AES (Advanced Encryption Standard), for encrypting the data, divides the secret into fixed-size blocks, and generates an Initialization Vector (IV) used to introduce randomness and prevent patterns in the encrypted secret. The client generates the encrypted secret by applying the encryption algorithm to the secret 428, using the DEK 432 and the IV.

In operation 406, the encryption client 422 communicates the DEK 432 to an encryption server 424 while retaining the encrypted secret. For example, the encryption client 422 communicates the DEK 432 to the encryption server 424 executing in a context of an encryption service 228 of the data platform 102. The encryption client 422 does not communicate the unencrypted secret to the encryption server 424 but instead retains the unencrypted secret within the aegis of the user account 430. The encryption server 424 receives the DEK 432.

In operation 408, the encryption server 424 fetches a TEK 436 from a TEK storage device 206 maintained by the data platform 102. For example, a key manager 204 (of FIG. 2) maintains a datastore of a set of TEKs as versioned objects of the data platform 102 that are referenced using pointers as more fully described in reference to FIG. 6A and FIG. 6B. In some examples, the encryption server 424 uses a pointer to a versioned TEK to fetch the TEK 436 from the TEK storage device 206.

In some examples, the encryption server 424 maintains a set of TEK versions in a local datastore such as a deployment bucket and uses a version pointer to point to a TEK version that is currently being used to encrypt and decrypt DEKs. During start up, the encryption server 424 fetches the version pointer and the set of TEKs from the TEK server and stores the version pointer and the set of TEKs in a local datastore. During operation, the encryption server 424 uses the version pointer to reference the TEK versions stored in the local datastore. During a TEK rotation, the encryption server 424 receives a copy of a new TEK version and an updated pointer to the new TEK version as more fully described in reference to FIG. 6A.

In some examples, the TEK storage device 206 is a storage device of a storage service provided by a Cloud Service Provider (CSP) that enables the storage and retrieval of data in the form of objects. In some examples, the TEK storage device 206 is a storage device of the data platform 102.

In operation 410, the encryption server 424 generates an encrypted DEK 434 using the DEK 432 and the TEK 436. For example, the encryption server 424 applies an encryption algorithm such as, but not limited to, AES, along with the TEK as the encryption key. The encryption algorithm utilizes the TEK to transform the DEK 432 into the encrypted DEK 434. In some examples, the encryption server 424 generates metadata of the encrypted DEK 434 such as, but not limited to, a TEK version name of the TEK 436 used to encrypt the encrypted DEK 434.

In operation 412, the encryption server 424 communicates the encrypted DEK 434 to the encryption client 422. In some examples, the encryption server 424 also communicates the metadata of the encrypted DEK 434 to the encryption client 422. The encryption client 422 receives the encrypted DEK 434 and any metadata of the encrypted DEK 434 communicated by the encryption server 424.

Figure 4C:
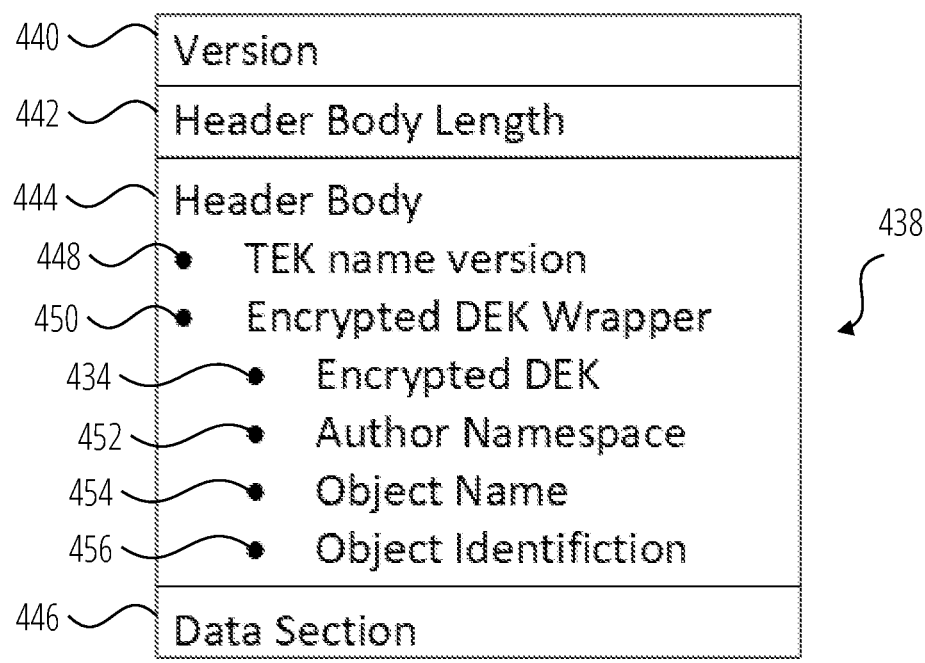
FIG. 4C is a data structure diagram of a blob, in accordance with some examples.

In operation 414, the encryption server 424 generates a binary large object (blob) 438 using the encrypted DEK 434 and the encrypted secret. For example, in reference to FIG. 4C, the encryption client 422 generates the blob 438 having a specified format. In some examples, the blob 438 includes a version identifier 440 identifying a version of the blob 438 format to which the blob 438 conforms. The blob 438 further includes a header body length 442 indicating a size or length of a header body 444 of the blob 438. The blob 438 further includes TEK identifier 448 identifying a name and version of the TEK 436 used to encrypt the DEK 432 used to encrypt the secret 428. The blob 438 further includes an encrypted DEK wrapper 450 that is a wrapper that is wrapped around the encrypted DEK 434 that was used to encrypt the secret 428. The blob 438 further includes the encrypted DEK 434 of the DEK 432. The blob 438 further includes an author namespace 452 identifying a namespace or scope within the data platform 102 that pertains to authorization or access control of the blob 438. The blob 438 further includes an object name 454 of the secret 428. The blob 438 further includes an object identifier 456 identifying the secret 428. The blob 438 further includes a data section 446 comprising the data of the encrypted secret.

In operation 416, the encryption client 422 communicates the blob 438 to the application 420. The application 420 receives the blob 438 and, in operation 418, stores the blob 438 in a user data storage device 426. In some examples, the user data storage device 426 is located on a system that is external to the data platform 102 such as, but not limited to, a cloud storage system, a file system that is a component of a device under the physical control of the user such as a personal computer, smartphone, or the like. In some examples, the data storage device 426 is a datastore on the data platform 102 that is a component of the user account 430.

In some examples, the encryption server 424 does not receive and, therefore, does not store, any data or metadata associated with the secret 428 or the encrypted secret. In some examples, the data platform 102 does not receive, store, or temporarily store the secret 428, the encrypted secret, the DEK 432, the encrypted DEK 434, or the blob 438 outside of the aegis of the user account 430.

In some examples, the encryption client 422 does not receive the TEK 436 and so does not use or store the TEK 436 in a datastore that is accessible to a user of the user account 430. In some examples, the encryption server 424 stores and uses a pointer to the TEK 436 that is stored as a data object of the data platform 102 and the encryption server 424 does not store the TEK 436 after using it to encrypt the DEK 432. In some examples, the encryption server 424 does not retain a copy of the DEK 432 or the encrypted DEK 434.

In some examples, the data platform 102 hosts a plurality of instances or shards of an encryption server that operate independently of each other.

In some examples, the encryption client and the encryption server implement a stateless CaaS service protocol for communicating DEKs and encrypted DEKs to each other.

In some examples, security of the system is improved as TEKs are isolated within the encryption service codebase in a compact storage location with few contributors.

In some examples, TEK observability is improved through logging every access to the TEKs and making the details available to compliance audits.

In some examples, every secret is encrypted with a unique DEK, which reduces the impact of a leaked key, limits the information available for cryptanalysis, and enables seamless adoption of new encryption algorithms in response to future algorithmic vulnerabilities.

Figure 5A:
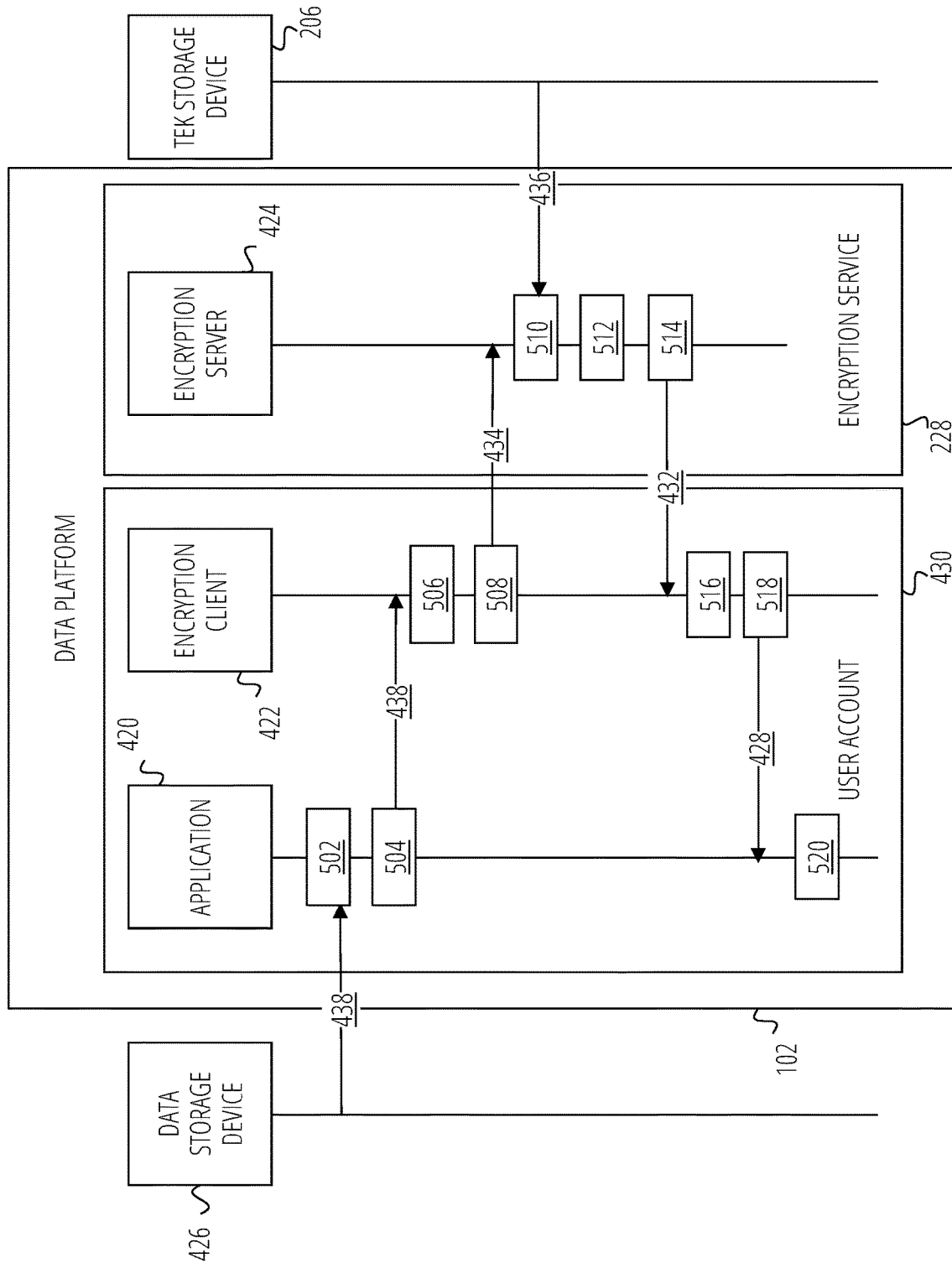
FIG. 5A is a sequence diagram of an encrypted secret use process, in accordance with some examples.
Figure 5B:
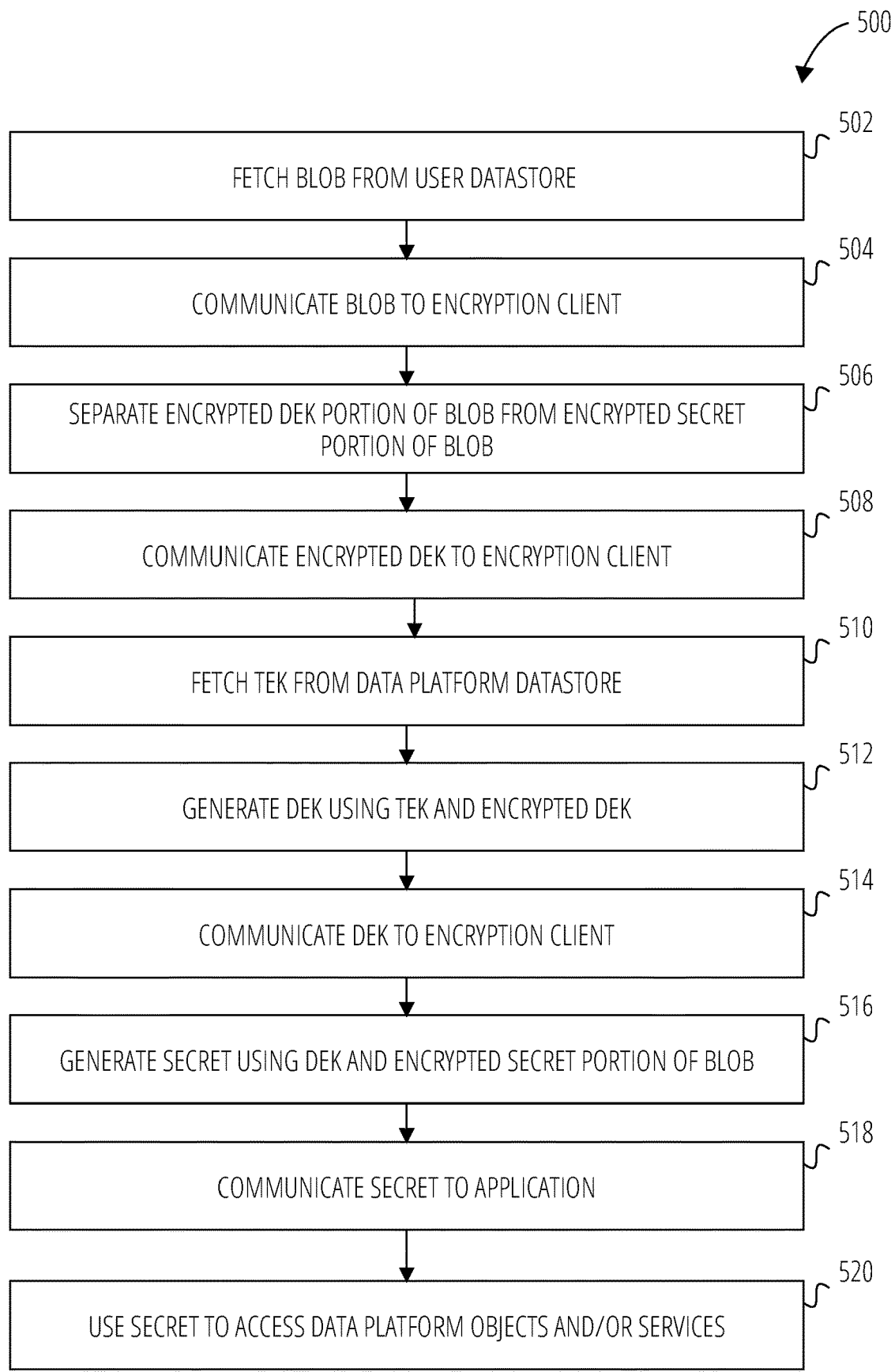
FIG. 5B is an activity diagram of an encrypted secret use method, in accordance with some examples.

FIG. 5A is a sequence diagram of an encrypted secret use process, and FIG. 5B is an activity diagram of an encrypted secret use method 500, in accordance with some examples. Although the encrypted secret use method 500 depicts a particular sequence of operations, the sequence of operations may be altered without departing from the scope of the present disclosure. For example, some of the operations depicted may be performed in parallel or in a different sequence that does not materially affect the function of the method. In other examples, different components of a data platform 102 may implement the encrypted secret use method 500 and may perform operations at substantially the same time or in a specific sequence.

In operation 502, an application 420 executing on a data platform 102 retrieves a blob 438 from a data storage device 426. For example, the application 420 executes on the data platform 102 in the context of a user account 430. The user account 430 is associated with a user of the data platform 102. Users may include, but are not limited to, providers of data services to one or more consumers on the data platform 102, consumers of the data services, a proprietor of the data platform, and the like.

In operation 504, the application 420 communicates the blob 438 to an encryption client 422. The encryption client 422, executing on the data platform 102 within the aegis of the user account 430, receives the blob 438 from the application 420.

In operation 506, the encryption client 422 separates an encrypted DEK 434 from the blob 438. For example, in reference to FIG. 4C, the blob 438 comprises the encrypted DEK 434 within an encrypted DEK wrapper 450 and the encryption client 422 extracts the encrypted DEK 434 from the encrypted DEK wrapper 450 of the blob 438. In some examples, the blob 438 further includes metadata of the encrypted DEK 434 such as, but not limited to, a TEK identifier 448 identifying a TEK 436 that was used to generate the encrypted DEK 434.

In operation 508, the encryption client 422 communicates the encrypted DEK 434 to an encryption server 424 while retaining the encrypted secret stored in the data section 446 of the blob 438. For example, the encryption client 422 communicates the DEK 432 to the encryption server 424 executing in a context of an encryption service 228 of the data platform 102. The encryption client 422 does not communicate the encrypted secret to the encryption server 424 but instead retains the encrypted secret within the aegis of the user account 430. The encryption server 424 receives the encrypted DEK 434. In some examples, the encryption client 422 communicates metadata of the encrypted DEK 434 such as, but not limited to the TEK identifier 448 of the TEK 436 that was used to generate the encrypted DEK 434.

In operation 510, the encryption server 424 fetches the TEK 436 from a TEK storage device 206 maintained by the data platform 102. For example, a key manager 204 (of FIG. 2) maintains a datastore of a set of TEKs as versioned objects of the data platform 102 that are referenced using pointers as more fully described in reference to FIG. 6A and FIG. 6B. In some examples, the encryption server 424 uses a pointer to a versioned TEK to fetch the TEK 436 from the TEK storage device 206.

In some examples, the encryption server 424 maintains a set of TEK versions in a local datastore and uses a version pointer to point to a TEK version that is currently being used to encrypt and decrypt DEKs. During start up, the encryption server 424 fetches the version pointer and the set of TEKs from the TEK server and stores the version pointer and the set of TEKs in a local datastore. During operation, the encryption server 424 uses the version pointer to reference the TEK versions stored in the local datastore. During a TEK rotation, the encryption server 424 receives a copy of a new TEK version and an updated pointer to the new TEK version as more fully described in reference to FIG. 6A.

In some examples, the encryption client 422 communicates metadata of the encrypted DEK 434 to the encryption server 424 such as, but not limited to, a TEK identifier 448 (of FIG. 4C) identifying the TEK 436 that was used to generate the encrypted DEK 434. The encryption server 424 generates the pointer to the TEK 436 using the TEK identifier 448. For example, the encryption server 424 maintains a table of TEK identifiers associated with respective pointers to TEKs stored on the TEK storage device 206. The encryption server 424 uses the TEK identifier 448 as an index into the table and retrieves the pointer to the TEK 436 from the table.

In operation 512, the encryption server 424 generates a DEK 432 using the encrypted DEK 434 and the TEK 436. For example, the encryption server 424 uses the TEK 436 as a decryption key to reverse the encryption process and obtain the original unencrypted DEK 432 using an appropriate decryption algorithm such as, but not limited to, AES or the like.

In operation 514, the encryption server 424 communicates the decrypted DEK 432 to the encryption client 422 and the encryption client 422 receives the DEK 432.

In operation 516, the encryption client 422 generates a secret 428 (of FIG. 4A) using the DEK 432 and the encrypted secret data stored in the data section 446 (of FIG. 4C) of the blob 438. For example, the encryption client 422 uses the DEK 432 as a decryption key to reverse the encryption process and obtain the original unencrypted secret 428 from the encrypted secret using an appropriate decryption algorithm such as, but not limited to, AES or the like.

In operation 518, the encryption client 422 communicates the secret 428 to the application 420 and the application 420 receives the secret 428.

In operation 520, the application 420 uses the decrypted secret 428 to access other data objects on the data platform 102, access systems external to the data platform 102, access contents of an object of the data platform 102, and the like.

Figure 6A:
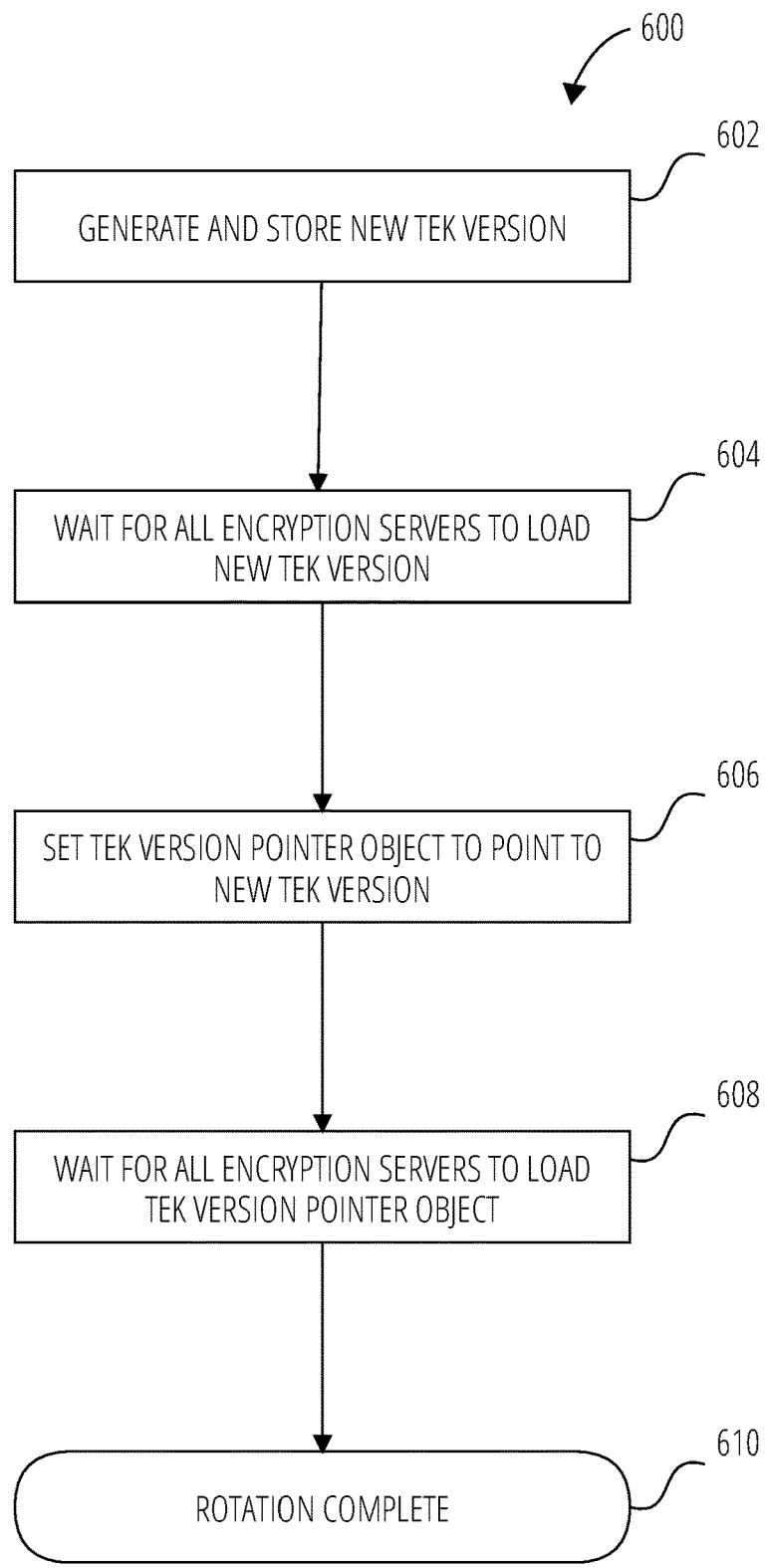
FIG. 6A is an activity diagram of a TEK rotation method, in accordance with some examples.
Figure 6B:
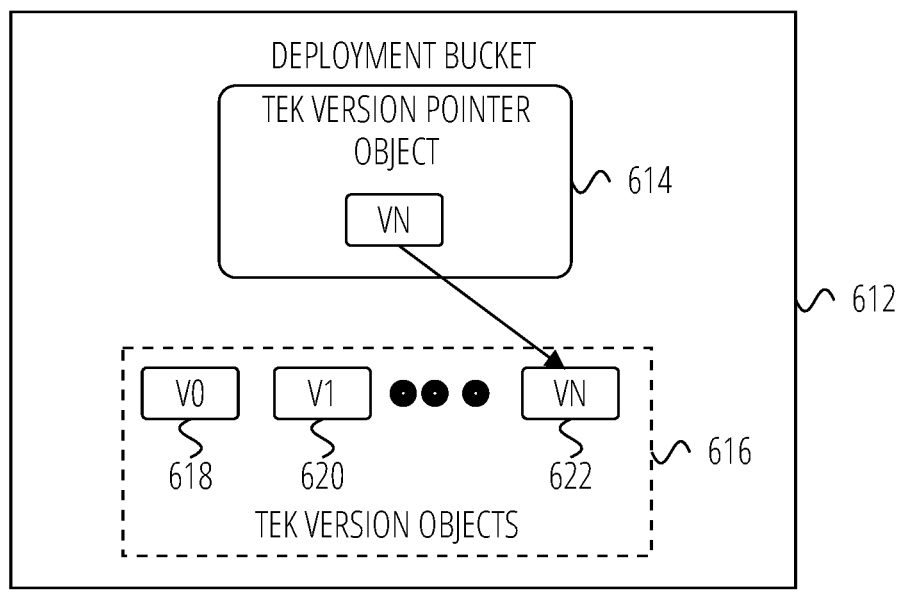
FIG. 6B is a data structure diagram of a TEK version pointer object, in accordance with some examples.

FIG. 6A illustrates a TEK rotation method and FIG. 6B is a data structure diagram of a TEK version pointer object, in accordance with some examples. Although the TEK rotation method 600 depicts a particular sequence of operations, the sequence of operations may be altered without departing from the scope of the present disclosure. For example, some of the operations depicted may be performed in parallel or in a different sequence that does not materially affect the function of the method. In other examples, different components of a data platform 102 may implement the TEK rotation method 600 and may perform operations at substantially the same time or in a specific sequence.

In operation 602, a key manager 204 of a data platform 102 (both of FIG. 2) generates a new TEK version and stores the new TEK version as an object on the data platform 102. For example, the key manager 204 uses a cryptographically secure random number generator or a hardware-based random source to generate the new TEK version. The key manager 204 securely stores the new TEK version as a database object on the data platform 102.

In operation 604, the key manager 204 waits for all encryption servers of a data platform 102 to load the new TEK version. For example, in reference to FIG. 6B, each of the encryption servers is provided with a deployment bucket 612 comprising a TEK version pointer object 614 and one or more TEK version objects 616, such as TEK version V0 618, TEK version V1 620, to TEK version VN 622.

In some examples, during deployment of the new TEK version, all encryption servers keep using the previous TEK version for encryption.

In some examples, each encryption server exposes a status Remote Procedure Call (RPC) that a rotation job of the key manager 204 can query to see which TEK versions are present on the server. In some examples, the rotation job waits for a natural restart of an encryption server to load the new TEK version. In some examples, the rotation job forces a restart of an encryption server. In some examples, the rotation job calls a reload RPC. In some examples, an encryption server periodically reloads any new TEK versions. In some examples, to account for natural churn, the waiting operation is executed over multiple passes to positively confirm every encryption server has loaded the new TEK version.

In operation 606, key manager 204 sets the TEK version pointer object 614 to point to the new TEK version, as exemplified by the TEK version pointer object 614 pointing to TEK version VN 622.

In operation 608, the key manager 204 waits for all encryption servers 424 to load the TEK version pointer object 614 pointing to the new TEK version. In some examples, during a transition period a subset of encryption servers use the old TEK version and remaining servers use the new TEK version for encryption. Note that all servers can process all decryption requests because they have all TEK versions after step 2 above is done.

In operation 610, the key manager 204 deems the TEK rotation to be complete once all of encryption server 424 have loaded the TEK version pointer object 614 pointing to the new TEK version.

Figure 7:
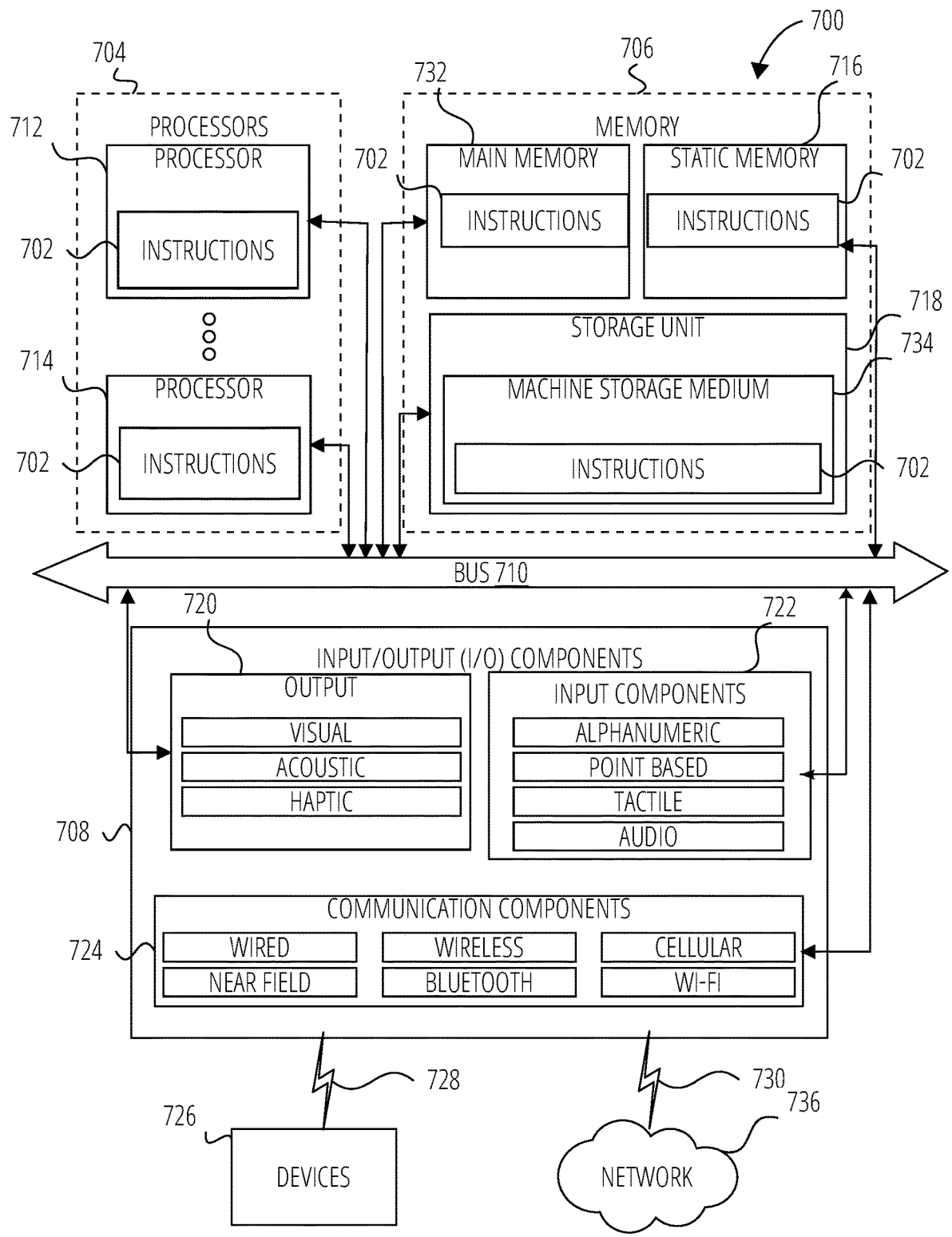
FIG. 7 illustrates a diagrammatic representation of a machine in the form of a computer system within which a set of instructions may be executed for causing the machine to perform any one or more of the methodologies discussed herein, in accordance with some examples.

FIG. 7 illustrates a diagrammatic representation of a machine 700 in the form of a computer system within which a set of machine-readable instructions may be executed for causing the machine 700 to perform any one or more of the methodologies discussed herein, according to examples. Specifically, FIG. 7 shows a diagrammatic representation of the machine 700 in the example form of a computer system, within which computer-readable instructions 702 (e.g., software, a program, an application, an applet, a data application, or other executable code) for causing the machine 700 to perform any one or more of the methodologies discussed herein may be executed. For example, the instructions 702 may cause the machine 700 to execute any one or more operations of any one or more of the methods described herein. In this way, the instructions 702 transform a general, non-programmed machine into a particular machine 700 (e.g., the compute service manager 104, the execution platform 110, and the data storage devices 1 to N of data storage 106) that is specially configured to carry out any one of the described and illustrated functions in the manner described herein.

In alternative examples, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 702, sequentially or otherwise, that specify actions to be taken by the machine 700. Further, while only a single machine 700 is illustrated, the term "machine" shall also be taken to include a collection of machines that individually or jointly execute the instructions 702 to perform any one or more of the methodologies discussed herein.

The machine 700 includes processors 704, memory 706, and I/O components 708 configured to communicate with each other such as via a bus 710. In some examples, the processors 704 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, multiple processors as exemplified by processor 712 and a processor 714 that may execute the instructions 702. The term "processor" is intended to include multi-core processors that may comprise two or more independent processors (sometimes referred to as "cores") that may execute instructions 702 contemporaneously. Although FIG. 7 shows multiple processors 704, the machine 700 may include a single processor with a single core, a single processor with multiple cores (e.g., a multi-core processor), multiple processors with a single core, multiple processors with multiple cores, or any combination thereof.

The memory 706 may include a main memory 732, a static memory 716, and a storage unit 718 including a machine storage medium 734, all accessible to the processors 704 such as via the bus 710. The main memory 732, the static memory 716, and the storage unit 718 store the instructions 702 embodying any one or more of the methodologies or functions described herein. The instructions 702 may also reside, completely or partially, within the main memory 732, within the static memory 716, within the storage unit 718, within at least one of the processors 704 (e.g., within the processor's cache memory), or any suitable combination thereof, during execution thereof by the machine 700.

The input/output (I/O) components 708 include components to receive input, provide output, produce output, transmit information, exchange information, capture measurements, and so on. The specific I/O components 708 that are included in a particular machine 700 will depend on the type of machine. For example, portable machines such as mobile phones will likely include a touch input device or other such input mechanisms, while a headless server machine will likely not include such a touch input device. It will be appreciated that the I/O components 708 may include many other components that are not shown in FIG. 7. The I/O components 708 are grouped according to functionality merely for simplifying the following discussion and the grouping is in no way limiting. In various examples, the I/O components 708 may include output components 720 and input components 722. The output components 720 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 722 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 708 may include communication components 724 operable to couple the machine 700 to a network 736 or devices 726 via a coupling 730 and a coupling 728, respectively. For example, the communication components 724 may include a network interface component or another suitable device to interface with the network 736. In further examples, the communication components 724 may include wired communication components, wireless communication components, cellular communication components, and other communication components to provide communication via other modalities. The devices 726 may be another machine or any of a wide variety of peripheral devices (e.g., a peripheral device coupled via a universal serial bus (USB)). For example, as noted above, the machine 700 may correspond to any one of the compute service manager 104, the execution platform 110, and the devices 726 may include the data storage device 226 or any other computing device described herein as being in communication with the data platform 102 or the data storage 106.

The various memories (e.g., 706, 716, 732, and/or memory of the processor(s) 704 and/or the storage unit 718) may store one or more sets of instructions 702 and data structures (e.g., software) embodying or utilized by any one or more of the methodologies or functions described herein. These instructions 702, when executed by the processor(s) 704, cause various operations to implement the disclosed examples.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various examples, one or more portions of the network 736 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 736 or a portion of the network 736 may include a wireless or cellular network, and the coupling 730 may be a Code Division Multiple Access (CDMA) connection, a Global System for Mobile communications (GSM) connection, or another type of cellular or wireless coupling. In this example, the coupling 730 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 702 may be transmitted or received over the network 736 using a transmission medium via a network interface device (e.g., a network interface component included in the communication components 724) and utilizing any one of a number of well-known transfer protocols (e.g., hypertext transfer protocol (HTTP)). Similarly, the instructions 702 may be transmitted or received using a transmission medium via the coupling 728 (e.g., a peer-to-peer coupling) to the devices 726. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 702 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some examples, the processor or processors may be located in a single location (e.g., within a home environment, an office environment, or a server farm), while in other examples the processors may be distributed across a number of locations.

Additional examples include:

Example 1 is a computer-implemented method comprising: receiving, by an application of a data platform, a secret; communicating, by the application to an encryption client, the secret; generating, by the encryption client, a DEK; generating, by the encryption client, an encrypted secret using the DEK and the secret; communicating, by the encryption client to an encryption server, the DEK while retaining the encrypted secret; fetching, by the encryption server, a TEK from a TEK server; generating, by the encryption server, an encrypted DEK using the TEK; communicating, by the encryption server to the encryption client, the encrypted DEK; generating, by the encryption client, a binary large object (blob) using the retained encrypted secret and the encrypted DEK; communicating, by the encryption client to the application, the blob; and storing, by the application, the blob.

In Example 2, the subject matter of Example 1 includes, wherein the application and the encryption client execute on a data platform, and wherein the application stores the blob on a data storage device that is external to the data platform.

In Example 3, the subject matter of any of Examples 1-2 includes, wherein the application and the encryption client execute on a data platform under a user account, and wherein the application stores the blob on a data storage device of the data platform under the user account.

In Example 4, the subject matter of any of Examples 1-3 includes, wherein the encryption server communicates metadata of the encrypted DEK to the encryption client.

In Example 5, the subject matter of any of Examples 1-4 includes, wherein the encryption client further uses the metadata of the encrypted DEK to generate the blob.

In Example 6, the subject matter of any of Example 1-5 includes, wherein the metadata of the encrypted DEK includes an identifier of the TEK.

In Example 7, the subject matter of any of Examples 1-6 includes, retrieving, by the application, the blob from the data storage device; communicating, by the application to the encryption client, the blob; extracting, by the encryption client, from the blob, the encrypted DEK and the metadata of the encrypted DEK; communicating, by the encryption client to the encryption server, the encrypted DEK and the metadata of the encrypted DEK; fetching, by the encryption server using the metadata of the encrypted DEK, from the TEK server, the TEK; generating, by the encryption server, the DEK using the encrypted DEK and the TEK; communicating, by the encryption server to the encryption client, the DEK; generating, by the encryption client, the secret using the DEK and the encrypted secret; communicating, by the encryption client to the application, the secret; and accessing, by the application, an object of a data platform using the secret.

In Example 8, the subject matter of any of Examples 1-7 includes, wherein the encryption server accesses the TEK using a pointer.

In Example 9, the subject matter of any of Examples 1-8 includes, wherein the application, the encryption client, and the encryption server execute on a data platform, and wherein the data platform hosts a plurality of instances of the encryption server.

In Example 10, the subject matter of any of Examples 1-9 includes, wherein the plurality of instances of the encryption server operate independently of each other.

Example 11 is at least one machine-readable medium including instructions that, when executed by processing circuitry, cause the processing circuitry to perform operations to implement any of Examples 1-10.

Example 12 is an apparatus comprising means to implement any of Examples 1-10.

Example 13 is a system to implement any of Examples 1-10.

Although the examples of the present disclosure have been described with reference to specific examples, it will be evident that various modifications and changes may be made to these examples without departing from the broader scope of the inventive subject matter. Accordingly, the specification and drawings are to be regarded in an illustrative rather than a restrictive sense. The accompanying drawings that form a part hereof show, by way of illustration, and not of limitation, specific examples in which the subject matter may be practiced. The examples illustrated are described in sufficient detail to enable those skilled in the art to practice the teachings disclosed herein. Other examples may be used and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Such examples of the inventive subject matter may be referred to herein, individually and/or collectively, by the term "example" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art, upon reviewing the above description.

What is claimed is:

1. A method comprising:
hosting, by a data platform, a plurality of encryption server instances, the plurality encryption server instances operating independently of each other;
generating, by a key manager of the data platform, a Transit Encryption Key (TEK) version;
storing the TEK version on a TEK storage device accessible to the plurality of encryption server instances;
setting, by the key manager, a TEK version pointer object to point to the TEK version; and
waiting, by the key manager, for each encryption server instance of the plurality of encryption server instances to load the TEK version before communicating the TEK version pointer object to the plurality of encryption server instances.

2. The method of claim 1, further comprising:
receiving, by an encryption server instance of the plurality of encryption server instances, an encrypted Data Encryption Key (DEK);
retrieving, by the encryption server instance, the TEK version using the TEK version pointer object; and
generating, by the encryption server instance, a decrypted DEK using the retrieved TEK version and the received encrypted DEK.

3. The method of claim 1, wherein storing the TEK version comprises storing the TEK version as an object on the data platform.

4. The method of claim 1, wherein the TEK storage device is a component of a cloud storage service.

5. The method of claim 1, wherein waiting comprises querying a status of each of the plurality of encryption server instances to determine that the TEK version is loaded.

6. The method of claim 1, further comprising: waiting, by the key manager, for the plurality of encryption server instances to load the TEK version pointer object before deeming a TEK rotation to be complete.

7. The method of claim 1, wherein each encryption server instance of the plurality of encryption server instances accesses the TEK version using the TEK version pointer object.

8. The method of claim 1, wherein each encryption server instance of the plurality of encryption server instances stores the TEK version locally after loading the TEK version from the TEK storage device.

9. The method of claim 1, wherein communicating the TEK version pointer object to the plurality of encryption server instances comprises forcing a restart of each of the plurality of encryption server instances.

10. A data platform comprising:
at least one processor; and
at least one memory storing instructions that, when executed by the at least one processor, cause the data platform to perform operations comprising:
hosting a plurality of encryption server instances, the plurality encryption server instances operating independently of each other;
generating, by a key manager of the data platform, a Transit Encryption Key (TEK) version;
storing the TEK version on a TEK storage device accessible to the plurality of encryption server instances;
setting, by the key manager, a TEK version pointer object to point to the TEK version; and
waiting, by the key manager, for each encryption server instance of the plurality of encryption server instances to load the TEK version before communicating the TEK version pointer object to the plurality of encryption server instances.

11. The data platform of claim 10, wherein the operations further comprise:
receiving, by an encryption server instance of the plurality of encryption server instances, an encrypted Data Encryption Key (DEK);
retrieving, by the encryption server instance, the TEK version using the TEK version pointer object; and
generating, by the encryption server instance, a decrypted DEK using the retrieved TEK version and the received encrypted DEK.

12. The data platform of claim 10, wherein storing the TEK version comprises storing the TEK version as an object on the data platform.

13. The data platform of claim 10, wherein the TEK storage device is a component of a cloud storage service.

14. The data platform of claim 10, wherein waiting comprises querying a status of each of the plurality of encryption server instances to determine that the TEK version is loaded.

15. The data platform of claim 10, wherein the operations further comprise: waiting, by the key manager, for the plurality of encryption server instances to load the TEK version pointer object before deeming a TEK rotation to be complete.

16. The data platform of claim 10, wherein each encryption server instance of the plurality of encryption server instances accesses the TEK version using the TEK version pointer object.

17. The data platform of claim 10, wherein each encryption server instance of the plurality of encryption server instances stores the TEK version locally after loading the TEK version from the TEK storage device.

18. The data platform of claim 10, wherein communicating the TEK version pointer object to the plurality of encryption server instances comprises forcing a restart of each of the plurality of encryption server instances.

19. A machine-storage medium storing instructions that, when executed by a data platform, cause the data platform to perform operations comprising:
hosting a plurality of encryption server instances, the plurality encryption server instances operating independently of each other;
generating, by a key manager of the data platform, a Transit Encryption Key (TEK) version;
storing the TEK version on a TEK storage device accessible to the plurality of encryption server instances;
setting, by the key manager, a TEK version pointer object to point to the TEK version; and
waiting, by the key manager, for each encryption server instance of the plurality of encryption server instances to load the TEK version before communicating the TEK version pointer object to the plurality of encryption server instances.

20. The machine-storage medium of claim 19, wherein the operations further comprise:
receiving, by an encryption server instance of the plurality of encryption server instances, an encrypted Data Encryption Key (DEK);
retrieving, by the encryption server instance, the TEK version using the TEK version pointer object; and
generating, by the encryption server instance, a decrypted DEK using the retrieved TEK version and the received encrypted DEK.

21. The machine-storage medium of claim 19, wherein storing the TEK version comprises storing the TEK version as an object on the data platform.

22. The machine-storage medium of claim 19, wherein the TEK storage device is a component of a cloud storage service.

23. The machine-storage medium of claim 19, wherein waiting comprises querying a status of each of the plurality of encryption server instances to determine that the TEK version is loaded.

24. The machine-storage medium of claim 19, wherein the operations further comprise: waiting, by the key manager, for the plurality of encryption server instances to load the TEK version pointer object before deeming a TEK rotation to be complete.

25. The machine-storage medium of claim 19, wherein each encryption server instance of the plurality of encryption server instances accesses the TEK version using the TEK version pointer object.

26. The machine-storage medium of claim 19, wherein each encryption server instance of the plurality of encryption server instances stores the TEK version locally after loading the TEK version from the TEK storage device.

27. The machine-storage medium of claim 19, wherein communicating the TEK version pointer object to the plurality of encryption server instances comprises forcing a restart of each of the plurality of encryption server instances.

* * * * *